(12) United States Patent
Janssen (10) Patent No.: US 6,485,041 B1
(45) Date of Patent: Nov. 26, 2002

(54) STEP-CYCLE FOR EXERCISE, RECREATION, AND TRANSPORT

(76) Inventor: Dean R. Janssen, 8135 C Severn Dr., Boca Raton, FL (US) 33433

( * ) Notice: Subject to any disclaimer, the term of this patent is extended or adjusted under 35 U.S.C. 154(b) by 0 days.

(21) Appl. No.: 09/713,814

(22) Filed: Nov. 15, 2000

(51) Int. Cl.[7] .............................. B62M 1/00; B62M 1/04
(52) U.S. Cl. ...................... 280/221; 280/252; 280/279
(58) Field of Search .............................. 280/221, 288.4, 280/293, 298, 304, 270, 278, 279, 241 M, 251–253, 282, 288.1, 220

(56) References Cited

U.S. PATENT DOCUMENTS

| | | | |
|---|---|---|---|
| 1,800,123 A | * 4/1931 | Wagen | 280/221 |
| 4,016,538 A | * 4/1977 | Miller | 280/293 |
| 4,084,656 A | * 4/1978 | Itoh et al. | 280/293 |
| 4,828,284 A | * 5/1989 | Sandgren | 280/221 |
| 4,883,284 A | * 11/1989 | Nakazawa et al. | 280/293 |
| 5,192,089 A | 3/1993 | Taylor | |
| 5,294,140 A | * 3/1994 | Rinkewich | 280/221 |
| 5,368,321 A | 11/1994 | Berman et al. | |
| 5,520,401 A | 5/1996 | Mohseni | |
| 5,938,568 A | 8/1999 | Maresh et al. | |
| 5,997,445 A | 12/1999 | Maresh et al. | |
| 6,170,846 B1 | * 1/2001 | Holter | 280/293 |
| 6,332,621 B1 | * 12/2001 | Wu | 280/87.041 |

FOREIGN PATENT DOCUMENTS

| | | |
|---|---|---|
| CH | 102054 | 11/1923 |
| FR | 545027 | 6/1922 |
| FR | 678505 | 12/1929 |
| FR | 690785 | 6/1930 |

* cited by examiner

*Primary Examiner*—Kevin Hurley
*Assistant Examiner*—Matthew Luby
(74) *Attorney, Agent, or Firm*—Malin, Haley & DiMaggio, P.A.

(57) ABSTRACT

A bicycle for providing stair-stepping exercise motion, recreation, and mode of transport comprising a frame that includes a unique triangular rear portion, a pair of wheels, one for the front, one for the back, a chain driven, teardrop-shaped propulsion system, left and right pedals having multiple positions between a horizontal and angular vertical upon which the operator rides, adjustable handle bars for steering, and a safety housing for covering the propulsion and wheel sprockets, chain, braking mechanism, and bike stand.

20 Claims, 5 Drawing Sheets

STEP-CYCLE FOR EXERCISE, RECREATION, AND TRANSPORT

BACKGROUND OF THE INVENTION

1. Field of the Invention

This invention relates generally to manually propelled bicycles, and more specifically to exercise, recreation, and transport bicycles that include a pedal and chain mechanism having a teardrop motion that allows for stair-stepping type exercise propulsion during transport of the bicycle.

2. Description of Related Art

The use of bicycles for exercise, recreation, and transport and other activities such as racing is well known in the prior art. On a conventional bicycle the operator traditionally sits on a seat and the pedal motion is essential circular. The use of chain, multiple gears and clutch mechanisms in conjunction with the pedal and sprocket are well known to provide for different gear ratios between the pedal sprocket and the rear wheel and a clutch mechanism that allows the bicycle to continue to coast forward when the pedals are stopped at any position.

One of the problems with a conventional bicycle from an ergonomic standpoint is that the operator is in a seated position, performing mechanical work in a relatively stressful position—bent forward at the waist, relying predominantly upon his/her quadricep muscles for propulsion and exercise. By placing the body in an upright position, the most efficient body position is achieved, utilizing a full complement of lower extremity muscles.

Stair-stepping type exercise is also known in the art. The objective is to decrease stress on the spine, joints, and lower extremities and to simulate walking upstairs for increased aerobic value. It is the intent of this invention to effectively combine the stair-stepping activity with recreational riding and transport by a bicycle.

There are devices shown in the prior art that attempt to provide a minimum form of exercise using pedals in an up and down motion. U.S. Pat. No. 5,192,089 issued Mar. 9, 1993, to Taylor shows a pedal operated scooter that includes cables, pulleys, and tension devices. The device is complex having a propulsion unit including multiple opposing sprockets and cables. The pedal mechanism is pivotal centrally.

U.S. Pat. No. 5,368,321, issued Nov. 29, 1994 to Berman et al., shows a dual footboard low profile exercise cycle. This device employs a chain and sprocket mechanism that is overly complex, expensive and does not provide a teardrop motion. It is believed that the teardrop motion provides better exercise results as a more natural movement for a person in the upright stair-step action. No related art presents a coupled oscillating teardrop motion.

U.S. Pat. No. 5,520,401, issued May 28, 1996 to Mohseni, shows a step drive cycle, having a conventional bicycle type configuration with a very complex proportioned system utilizing a plurality of belts and pulleys not in the present invention.

The present invention overcomes the problems in the prior art by providing a bicycle frame profile specially suited to a teardrop and stair-stepping type motion with a noncomplex propulsion system having conventional sprockets, multi-gear and clutch mechanism configured to provide for safe, stable, and efficient stair-stepping motion. The frame configuration insures that each pedal achieves a horizontal position upon a complete and full downstroke of each foot pedal. The invention also includes a spring-loaded, cable-controlled bike stand encased within the protective housing which allows the unit to be stationary in an upright position when not in use.

BRIEF SUMMARY OF THE INVENTION

A bicycle for providing stair-stepping exercise motion, recreation, and mode of transport comprising a frame that includes a unique triangular rear portion, a pair of wheels, one for the front, one for the back, a chain driven, teardrop-shaped propulsion system, left and right pedals having multiple positions between a horizontal and angular vertical upon which the operator rides, adjustable handle bars for steering, and a safety housing for covering the propulsion and wheel sprockets, chains braking mechanism, and bike stand.

The frame is constructed of a tubular, light weight, strong material such as steel or aluminum, and includes a unibody designed center portion, a triangular rear frame portion which consists of a center vertical strut, two upper rear frame connectors, and two lower rear frame connectors which connect the rear wheel and the propulsion sprocket to the frame, and a forward angled frame portion that includes dual columns for retaining and attaching the front wheel of the bicycle.

The forward frame portion also includes a slightly angled yet substantially vertical tubular section to receive an adjustable height handlebar for steering. This forward frame portion may be hinged to provide for adjustable angular settings to accommodate various size operators. The steering mechanism is substantially conventional, as on a conventional bicycle in which the handlebars are connected to a pivotal fork that allows turning of the front wheel while the frame remain rigid. The forward vertical tubular section of the bicycle frame is angled upwardly to connect to or receive the handlebar support.

The rear portion of the frame includes on each side a left and right upper and lower rear frame connector that joins the rear wheel to the frame, essentially supporting the rear wheel in a fork to a main vertical strut elevated from the base of the frame. Specifically, the upper rear frame connector is superiorly angulated approximately 30–35 degrees from the center of the rear wheel, while the lower rear frame connector is inferiorly angulated from the center of the rear wheel to meet the posterior aspect of the intersection of the main vertical strut and center portion of the unibody frame. A superior sprocket is mounted on the superior aspect of the vertical strut at the intersection of the upper rear frame connector and the vertical strut and is connected by a conventional bicycle chain to an inferior sprocket on the rear wheel which can contain multiple gears, a clutch mechanism and a conventional bicycle propulsion unit at the rear wheel. The lower rear frame connector is angled such that the entire frame, especially through its middle portion, is completely horizontal to the riding surface and is about 6 to 8 inches off the ground. Preferably the rear wheel will be larger in diameter than the front wheel to allow adequate ground clearance of the most inferior aspect of the chain mechanism and protective housing cover, to allow adequate ground clearance of the down stroke foot pedal especially at the rear of each foot pedal, with its lowest position being horizontal to the earth and parallel to the unibody frame, to lessen the amount of work and effort required of the operator to achieve the desired speed and performance, to maintain a fairly modest standard length of the bicycle frame, thereby providing a shallower pitch and angulation of the foot pedals, thus ensuring stability and safer operation. The preferred ratio of rear to front wheel diameters is about 2:1. There appears to be no mechanical or structural advantage achieved by utilizing equal wheel dimensions, however, a step-cycle would function using equal wheel dimensions.

A pair of elongated left and right pedals are pivotally and moveably attached at the front ends to projections extending laterally from the frame on each side. The forward connection of each pedal includes an elliptical slot that fits into the frame projections that permits front and backward motions and pivotal motion of the pedal at the front portion of the pedal.

The superior propulsion sprocket mounted on the superior aspect of the main vertical strut includes two sprocket arms extending and rigidly affixed to the sprocket in opposite 180-degree directions that have connectors that connect to the rear end portion of each pedal which permit rotational movement of the rear portion of the pedal.

In its lowest downstroke position, one pedal would be horizontal to the frame and the ground, and the opposite pedal will be in its most angulated/pitched position while in its highest upstroke position.

A protective housing is used to encase the superior and inferior rear sprocket propulsion system, the rear braking mechanism, chain, and bike stand of the rear wheel. This housing is made of a bi-fold, durable plastic which is designed to prevent any interaction between these components and the operator or the operator's clothing. This bi-fold design is held together with 4–5 easy turn screws which allows for easy access to these components.

Within the protective housing is also a spring-loaded, cable-controlled, moveable, rotatable, rigid bar that has two positions, up or down, that acts as a bike stand to allow support of the bicycle in an upright position when it is not being operated. The bike stand is stored within the protective housing when not in use. The cable-controlled bike stand utilizes two springs, one large and one small. The large spring with stronger tension is used to set the bike stand into the lowered "released" position. This spring attaches the bike stand to the fixed side of the rear wheel protective bi-fold cover. The small spring with lighter tension is connected to a stopper/latch which holds the bike stand in the upright "locked" position. A first cable end will connect to the small spring loaded stopper/latch, while a second cable end is connected to a handlebar lever accessible to the rider. By simply tightening the handlebar lever, the small spring connected to the stopper latch will compress and shorten, releasing the larger spring and bike stand into the lowered "released" position.

The operator can stand on each pedal and apply downward pressure on one of the pedals to begin propulsion of the bicycle, thereafter alternating this stair-step action between pedals. This continued stair-stepping motion can be continuously applied or the operator can stop the stair-step motion and the bicycle will continue to coast because the sprocket clutch allows free wheeling of the bicycle in a forward direction when the pedals are not being operated. During operation of the stair-stepping motion on the propulsion unit, each pedal can move backwards and forwards at the forward portion of the pedal and circularly at the rear portion of the pedal providing an overall natural teardrop exercise motion. The low angled frame of the bicycle is very stable and reduces the center of gravity. The triangular rear frame portion includes one main vertical strut, two lower rear frame connectors, and two upper rear frame connectors, which are angled at approximately 30 to 35 degrees and provide the proper orientation and range of motion of the pedals during exercising while providing a noncomplex propulsion unit using conventional bicycle sprockets and a multiple gear mechanism.

Conventional type brake pads are uniquely positioned on the two lower rear frame connectors, angled superiorly and obliquely. These brake pads are covered by the protective housing. These rear brake pads create drag on the bicycle rear tire from a hand actuated hinged handle mounted on the handlebars to which the brake cables are connected. Front brake pads will be utilized in the same conventional manner on the front wheel.

It is the object of this invention to provide an improved bicycle for exercise, recreation, and transport which uses a teardrop stair-stepping motion to propel the bicycle.

Yet another object of this invention is to provide an improved bicycle construction utilizing a substantially conventional sprocket and chain technology in a noncomplex way to provide a stable platform for a teardrop stair-stepping exercise and mode of transportation.

Additional objects, advantages, and novel features of the invention will be set forth in part in the description which follows and in part will become apparent to those skilled in the art upon examination of the following or may be learned by practice of the invention. The objects and advantages of the invention may be realized and attained by means of the instrumentalities and combinations particularly pointed out in the appended claims.

In accordance with these and other objects, which will become apparent hereinafter, the instant invention will now be described with particular reference to the accompanying drawings.

PREFERRED EMBODIMENT OF THE INVENTION

Figure 1:
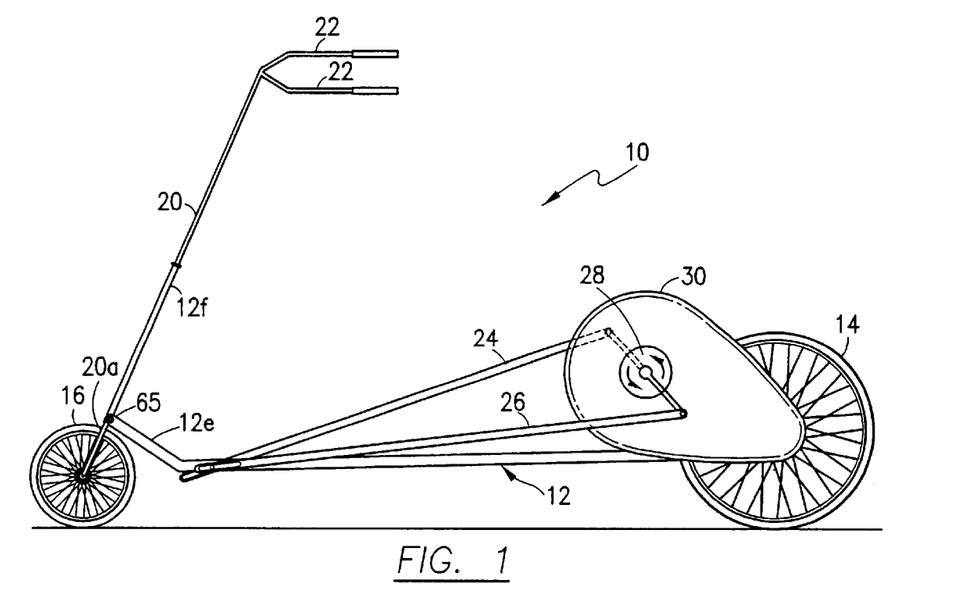
FIG. 1 shows a side elevation of the present invention.

Referring now to FIG. 1 the present invention is shown generally at 10 comprised of a rigid tubular metal, aluminum or steel, frame 12 connected to a pair of inline wheels the front wheel 16 and rear wheel 14, that includes a propulsion system having a sprocket 28 mounted on the frame and a pair of pedals, right 24 and left 26, which are utilized to propel the vehicle forward. The bicycle includes a pair of conventional handlebars 22 connected to a rigid adjustable handlebar support 20, a single rod that telescopes into a hinged tubular frame member 12*f*, which is adjustable forward and backward at hinge 65 for ease and safety of use by a variety of sized operators, said hinge intersects at the distal end of the forward frame section 12*e* of frame 12. From the hinged tubular frame member emanates a pair of rigid arms 20*a* that are connected to the front wheel 16. Handlebar support 20 and rigid arms 20*a* rotate about the inside of frame portion 12*f* in a conventional way and are mounted to be held in position conventionally. The steering mechanism does not form any part of the overall invention.

Figure 5:
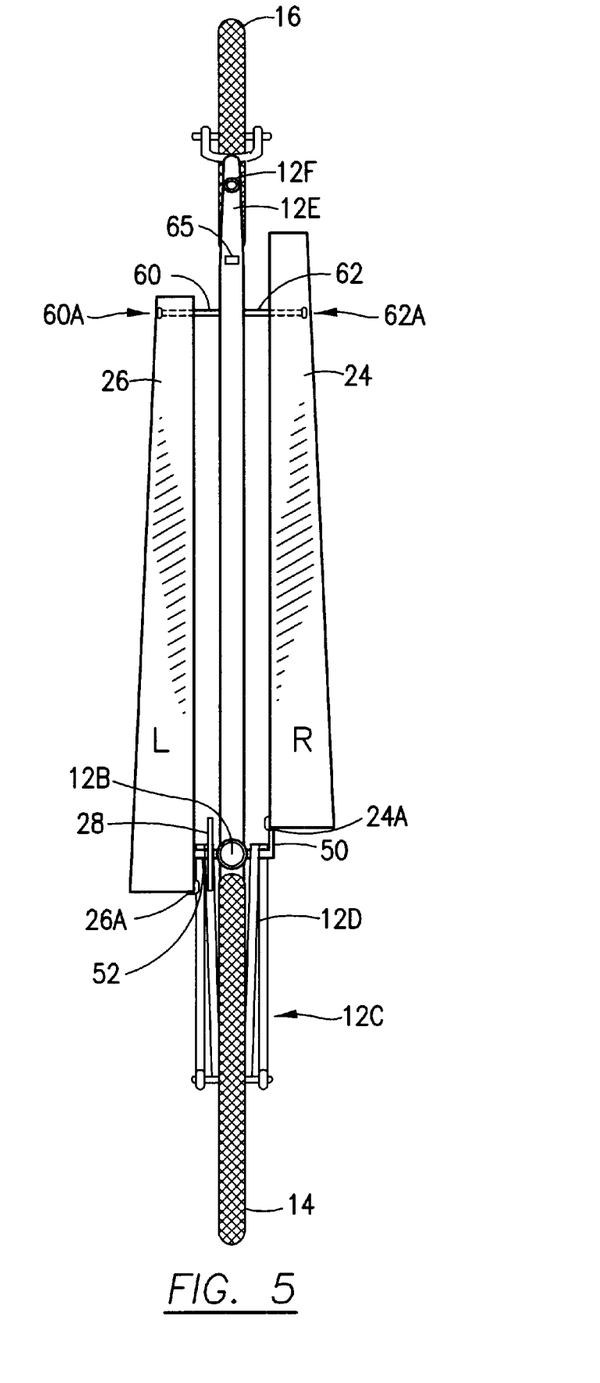
FIG. 5 shows a top plan view of the frame and propulsion sprocket utilized in the present invention.
Figure 6:
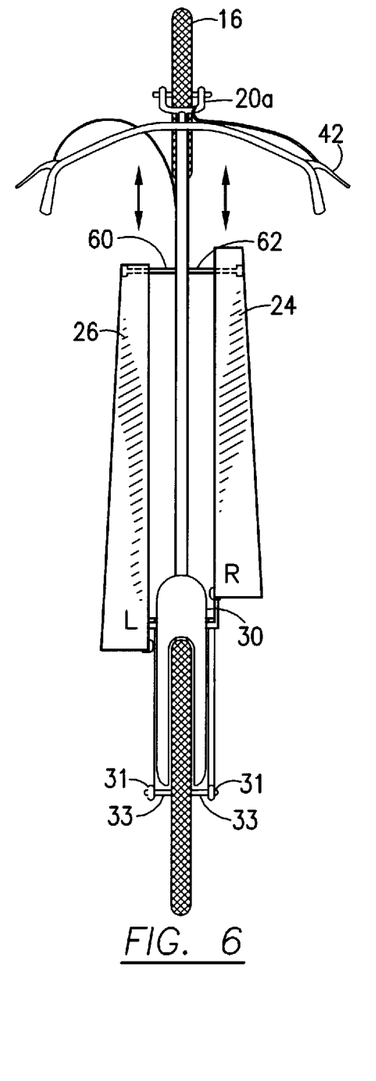
FIG. 6 shows a top plan view of the present invention.
Figure 7:
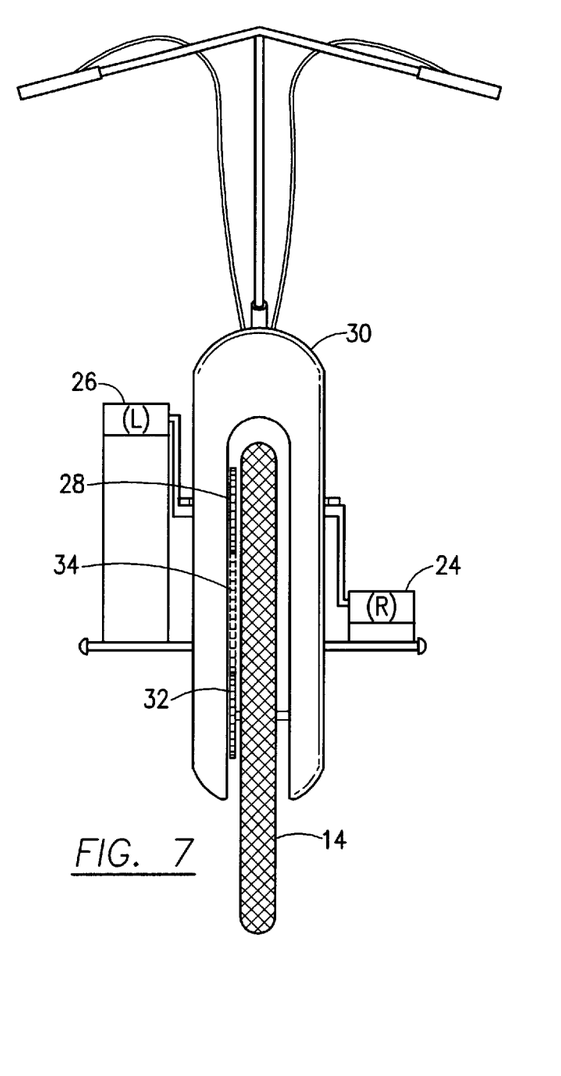
FIG. 7 shows a rear elevational view of the present invention as if in motion.

The right pedal 24 and left pedal 26, which are connected at the front end of each pedal to projections 62 and 60 respectively, extending laterally from the frame 12 as shown in FIGS. 5 and 6, permit a coupled back and forth at the front as well as circular motion at the rear of the pedal, creating an overall teardrop motion. The propulsion mechanism unit is covered by a safety housing 30 to prevent interaction with the sprockets, chain, braking mechanism and bike stand by operator or the operator's clothing during operation.

Figure 2:
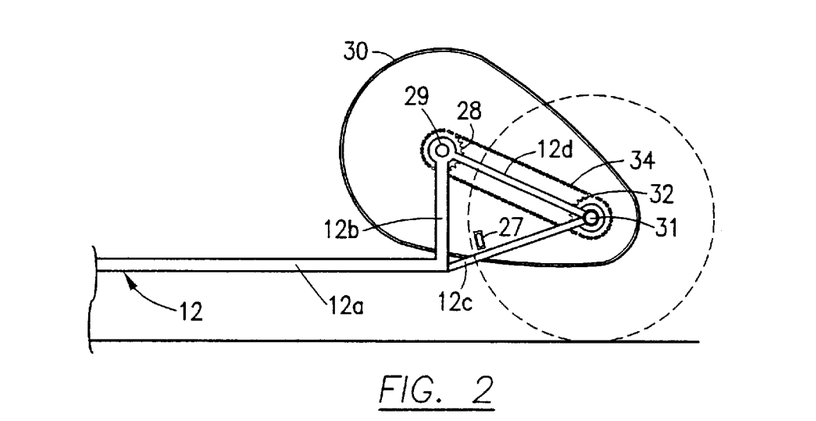
FIG. 2 shows a side elevational view of the rear portion of the present invention partially cut away, showing the propulsion mechanism of the present invention.

Referring now to FIG. 2, the propulsion system and frame arrangement is shown. The overall unitary rigid frame 12 includes a middle portion 12*a* which terminates posteriorly at the intersection of the inferiormost aspect of the main vertical strut and the lower rear frame connector 12*c*. The vertical strut 12*b* rigidly attached thereto terminates superiorly at the propulsion sprocket 28. The lower rear connector 12*c* connects and forms a triangle with the upper rear frame connector 12*d* at the center of the rear wheel. The frame shows the same on each side of the bike so there are two separate right and left triangular frames that are used to support a rear wheel 14 through inferior sprocket 32 and rear wheel axle 31. During pedaling, superior sprocket 28 rotates and moves chain 34 thus driving sprocket 32, which may be a multiple gear conventional bike sprocket including a free wheeling clutch. The upper rear frame connector 12*d* is angled and preferably supports a standard 24-inch or 26-inch bicycle wheel; however, a larger or smaller wheel may function as well. The fixated side of the housing 30 is shown which would actually cover sprockets 28 and 32 in such way as to protect the operator, the operator's clothing or other articles from engaging the chain 34, rear brake pads 27, or the sprockets 28 and 32. The housing 30 comprises two pieces, a fixated side and detachable side which can be removed to allow access to the mechanism within when necessary. Superior propulsion sprocket 28 has a pair of radial arms 33 disposed at 180 degrees to each other one on each side of the sprocket where the vertical axle 29 through the sprocket 28 connects to the rear end of the pedals (not shown in FIG. 2) to permit propulsion and rotation of the sprocket mechanism 32 and therefore the rear wheel 14. The position of the rear brake pads 27, attached to the lower rear frame connector 12*c*, is shown within the protective housing 30.

The rear wheel 14 is positioned between the upper and lower rear frame connectors 12*d* and 12*c*, respectively. As previously described, the steering mechanism and front braking system is conventional as in a normal bicycle. The front brake pads 25 shown in FIG. 4 are activated in a conventional manner.

Figure 3:
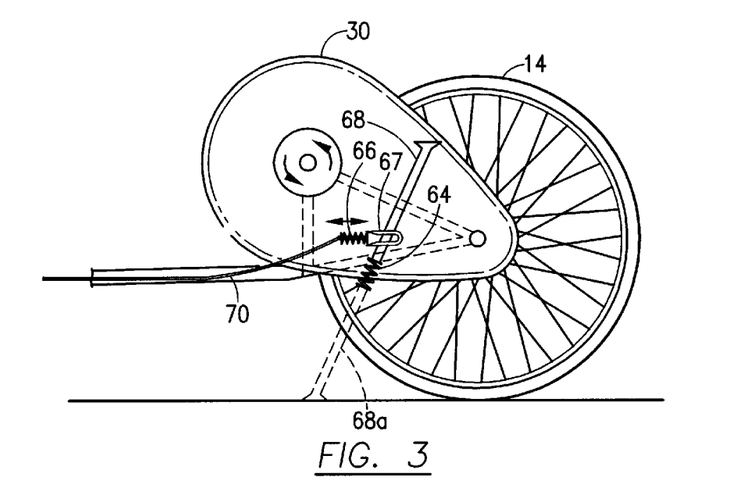
FIG. 3 is a side elevational view of the rear portion of the frame and rear wheel showing the bike stand released in use and in latched position hidden behind housing during non-use.
Figure 8:
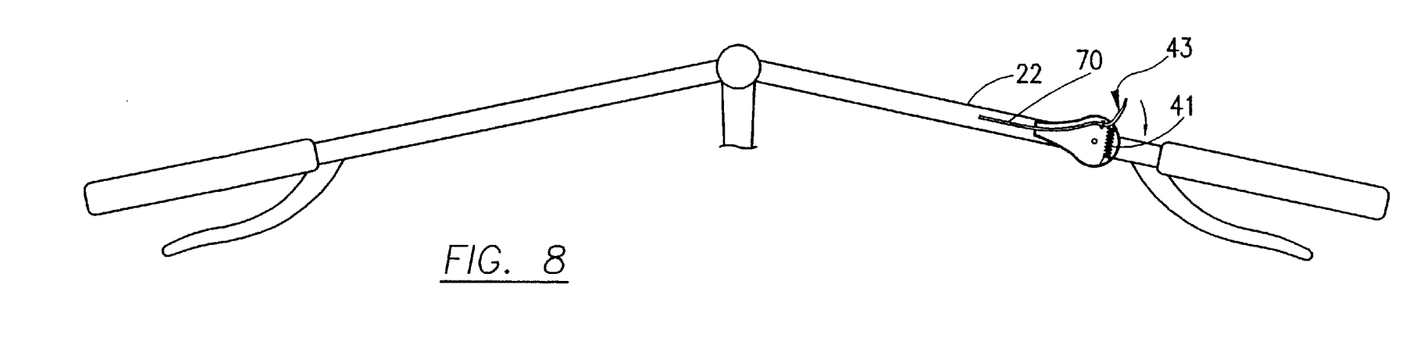
FIG. 8 shows a forward perspective view of the handlebar assembly from the view of the rider and positioning of the kickstand activation mechanism.
Figure 8A:
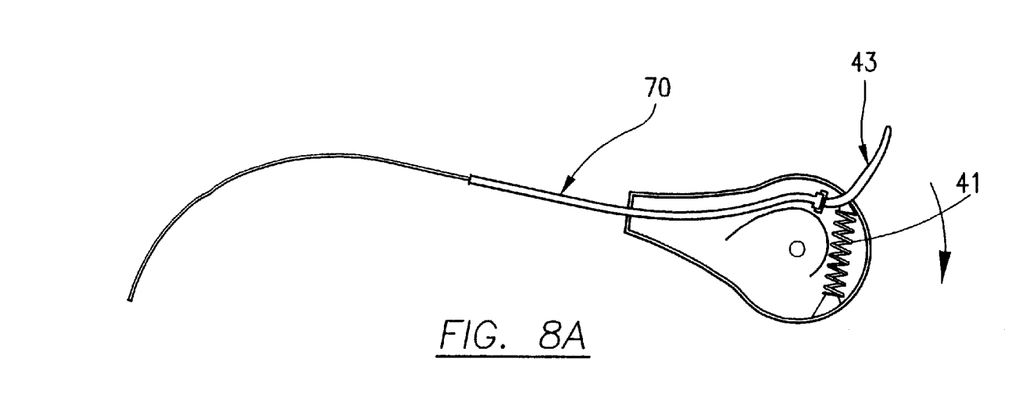
FIG. 8A is a close-up of circled portion of FIG. 8, showing the kickstand activation mechanism.

Referring now to FIGS. 3, 8, and 8A, the spring-loaded, cable-controlled bike stand 68 used to support the bicycle when it is not in use. Upon hand-controlled activation of cable 70 via compression of the spring 41 connected to the hand-controlled lever 43 on handlebars 22, the spring 66 releases a stopper latch 67 which in turn activates spring 64, allowing the bike stand to rotate downward into an anteriorly angular support position in direct ground contact. The bike stand 68 is angulated in both the locked and released positions approximately 180 degrees apart, allowing adequate clearance from the revolving foot pedal/levers in any stopped position and more central contact with the ground for optimal stability between the front wheel and rear wheel. The preferred angulation of the bike stand in stored and retracted non-use position is perpendicular to the upper rear frame connector 12*d*. Upon cable 70 activation, the bike stand rotates anteriorly, and downward from behind the housing 30 to position shown as 68*a*.

Figure 4:
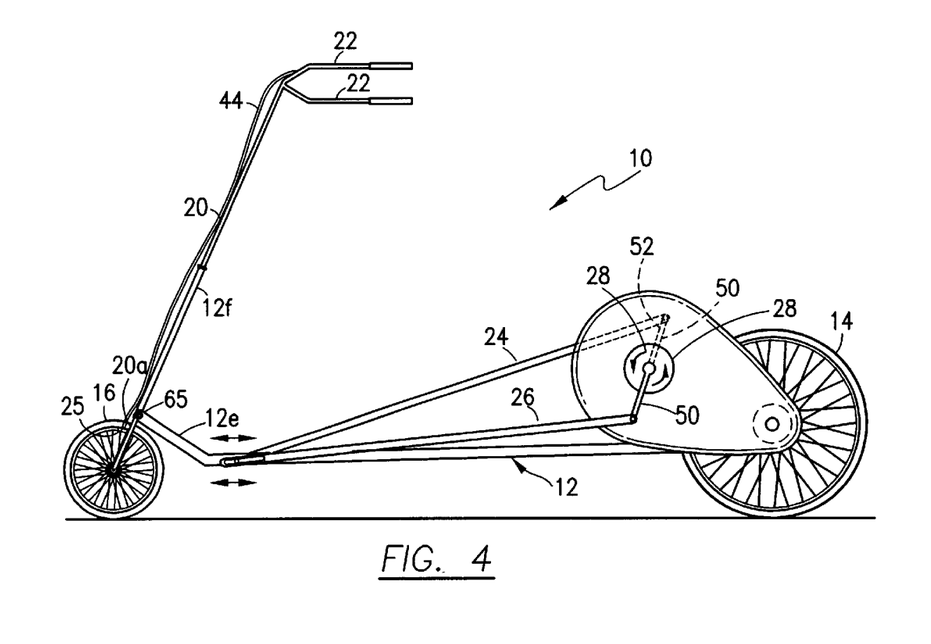
FIG. 4 shows a side elevational view of the present invention.

Referring now to FIG. 4, the pedal mechanism is shown with right pedal 24 and left pedal 26 as elongated substantially rectangular rigid planar members. The left foot pedal 26 is connected on the left side of the bicycle of frame 12. The right foot pedal 24 is connected on the right side of the bicycle frame 12. Pedal 24 includes at its forward end a support block 61 and pedal 26 includes a counterpart support block 63 on the left, shown in FIGS. 5A and 5B having an elongated slot 62*a* on the right and 60*a* on the left along its longitudinal length connecting rigidly to the bottom side of the right pedal 24 or left pedal 26. Alternatively, these right and left support blocks 61 and 63 may be internally encased within the anterior portion of each foot pedal. The frame 12 includes a lateral rigid connector pin 62 on the right side and 60 on the left side that is interlocked into the elongated pedal support slot 62*a* on the right side and 60*a* on the left side which in effect allows each pedal to proceed in a backward and forward coupled motion while at the same time allowing the pivotal motion relative to frame 12. The elongated pedal support slot 60*a* is shown in FIG. 5B is the left side counterpart to 62*a* on the right side shown in close up in FIG. 5A. This provides for the teardrop motion described herein.

The superior propulsion sprocket 28 has a pair of arms 50 on the right and 52 on the left each of which respectively engages a different foot pedal, 24 on the right, 26 on the left. The arms 50 and 52 are approximately 180 degrees apart and project radially from the center of sprocket 28. Arm 50 is moveably connected to the rear connector of right foot pedal 24. The Left foot pedal 26 is connected at its end to arm 52. Thus it is seen that when the bicycle is propelled by pushing down on the upside foot pedal, for example the right foot pedal 24 shown in FIG. 4, arm 50 would rotate sprocket 28 connected to the chain that rotates the rear wheel 14. The front of right foot pedal 24 moves in a back and forth motion within the elongated slot 62*a* connected to the frame and connector pin 62 and in the rear section it will rotate relative to the connecting arm 50 in a circular fashion. The left foot pedal 26 moves in a back and forth motion within elongated slot 60*a* connected to the frame and projection pin 60 and in the rear section it will rotate relative to the connecting arm 52 in a circular fashion, the result being a coupled teardrop motion for each foot pedal. Because of the multiple gears and axle structure that includes a coasting clutch while the vehicle is operating, the operator can stop all foot movement and coast with the vehicle as a conventional bicycle.

The low center of gravity of the bike is due to its unusual design, specifically achieved by its larger rear wheel and smaller front wheel, as well as its unique superior angulation of the lower rear frame connector, allowing the bicycle to sit lower to the ground while providing maneuverability and stability during operation.

In FIG. 5 the handlebars 22, handlebar support 20, and protective cover 30 are removed. The upper rear frame connector 12d is connected to the superiormost aspect of the vertical strut 12b while the lower rear frame connector 12c is connected to the inferiormost aspect of the vertical strut 12b to form the rigid triangle shown in FIG. 2. The right pedal 24 is connected to a rigid projection 62 within slot 62a described below. Rear portion of the pedal 24 is connected to arm 50 from the sprocket 28 and is on a ball-like connector 24a to permit total freedom of movement between the circular rotations of the rear end of pedal 24 through connector 24a. Likewise the left pedal 26 has a rear connector 26a that is attached to the arm 52 that connects the sprocket 28 and is on a ball-like connector 26a with the rear end of pedal 26 which like pedal 24 rotates in a circular path or line of movement like that explained for right pedal 24.

Figure 5A:
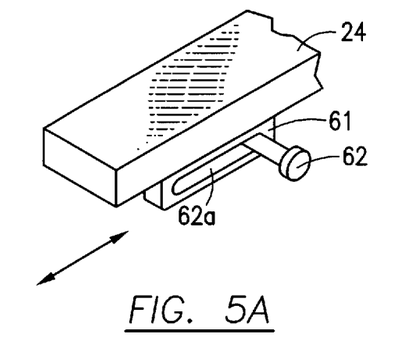
FIG. 5A shows a side elevational perspective view of the right pedal, support block, connector pin and elongated slot.
Figure 5B:
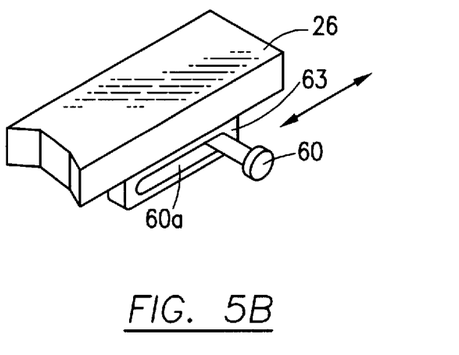
FIG. 5B shows a side elevational perspective view of the left pedal, support block, connector pin, and elongated slot.

Referring to FIG. 5A, in closeup a support block 61 that includes an elongated slot 62a is connected to the frame by a connector pin 62 which allows the right pedal 24 to move back and forth radially relative to the frame 12. A corresponding configuration of the left pedal 26 utilizing connector pin 60, elongated slot 60a and support block 63 in closeup is shown in FIG. 5B.

Referring now to FIG. 6 showing the top view of the device, the noncomplex nature of the pedals is revealed and are oriented for stability with the lowest path being horizontal to the earth and parallel to the frame 12. Connected to the handlebars 22 are a pair of hinged handles 42 which actuate front and rear brakes connected by conventional brake cables 44

What is claimed is:

1. A bicycle for recreation, exercise, and transport comprising:
   a unibody frame having forward, middle, and rear sections wherein said rear section comprises a vertical strut member extending vertically from the rear end of said middle frame section, terminating in a distal vertical strut end portion, a cylindrical frame housing having a passageway mounted on the distal end of said vertical strut for retaining a propulsion sprocket and;
   a pair of upper separated rear frame bars connected at one end to said cylindrical frame housing and extending downward and rearward at approximately a twenty to fifty degree angle; and
   a pair of lower rear frame bars separated in parallel extending upward and rearward and each bar connected at one end of the intersection of the rear end of the middle frame section and the bottom end of the vertical strut said upper rear bars and said lower rear bars forming two triangular rear frame sections one on each side and spaced apart for receiving a rear wheel;
   said rear frame section including a slot for receiving a bicycle wheel axle;
   a steering member connected to the forward portion of said frame having a front wheel and axle disposed at one end of said steering member and a pair of handlebars and a handlebar support bar adjustably connected to the opposite end of said steering member;
   a rear wheel connected to the rear frame section, said rear wheel including a rear wheel sprocket, wheel axle and coasting means to allow the bike to coast;
   a propulsion sprocket rotatably connected to said cylindrical frame housing connected at the top of said vertical strut frame member and having a portion encased within said cylindrical frame housing for rotational movement of said propulsion sprocket;
   a chain connected between said propulsion sprocket and said rear wheel sprocket;
   said middle frame section including a right rigid connector pin connected on the right side of said unibody frame and a left rigid connector pin connected on the left side of said unibody frame;
   a left crank arm and a right crank arm rigidly connected to said propulsion sprocket substantially 180 degrees apart;
   a right bicycle pedal including a support body having at its front end an elliptical, elongated slot that connects to said middle frame section right connector pin at the front end of said bicycle pedal in an elongated slot, the longitudinal axis of which is parallel to the bicycle pedal body and having a rotatable fastener connected at the rear end portion of said bicycle pedal and to said propulsion sprocket right crank arm; and a left bicycle pedal including a support body at its front end having an elliptical, elongated slot that connects to said left connector pin at the front end of said bicycle pedal support body and having a rotatable fastener connected at the rear end of said left bicycle pedal support body and to said propulsion sprocket left crank arm, said left pedal connected at approximately 180 degrees from said right pedal to said left pedal to said left and right crank arms connected to said propulsion sprocket;
   whereby said right pedal and said left pedal have coupled forward and backward linear movement at the front of each pedal and the right pedal and the left pedal have circular movement at the rear of each pedal left and right relative to said propulsion sprocket thereby providing a teardrop pedal motion when pedaling said bicycle; said teardrop motion resulting from the combination of linear motion at the front of each pedal and circular motion at the rear of each pedal.

2. A bicycle as in claim 1 further including a bike stand apparatus comprising:
   a leg assembly means connected to said frame of said bicycle by a spring mounting means fixed to a stopper latch within said housing such that said leg assembly is capable of being placed in a lowered position or in a retracted position by actuation of a hand operated cable connection between said spring mounting means and a hinged handle connected to said handlebar of said bike;
   wherein said leg assembly means is capable of maintaining said bicycle in an upright orientation when said leg assembly means is in a lowered anteriorly angulated position;
   wherein said leg assembly means includes a spring releasing means fixed thereto which when activated sets the leg assembly to said lowered position in supportive juxtaposition with the ground surface such that said bicycle is maintained in a substantially upright orientation to said ground surface.

3. A bicycle as in claim 2, further including a cable-operated braking means comprising a pair of brake pads disposed against the front wheel and a pair of brake pads disposed against the rear wheel, said rear wheel brake pads emanating from said lower rear frame connector bar.

4. A bicycle as in claim 3, further including a housing covering said propulsion sprocket, said rear wheel sprocket, said chain, said braking means, and said bike stand to prevent the operator or the operator's clothing from interacting with said sprockets, said chain, said braking means, and said bike stand.

5. A bicycle as in claim 1, wherein said handlebar support telescopes within a tubular frame portion which hingedly connects to the end of said forward frame section such that said steering member is pivotally adjustable forward and backward for comfortable ease of use by an operator.

6. The bicycle as in claim 1, wherein said rear wheel is about 24 inches in diameter and said front wheel is about 12 inches in diameter.

7. The bicycle as in claim 1, wherein said rear wheel is larger in diameter than the diameter of said front wheel.

8. The bicycle as in claim 1, wherein said angle of connection between said upper rear frame connector and said rear wheel axle is between approximately 30 and 35 degrees.

9. The bicycle as in claim 1, wherein said middle section of said unibody frame is between about 6 and 8 inches above the ground during operation of said bicycle.

10. A bicycle for recreation, exercise, and transport, comprising:
- a unibody frame, having a forward section, a middle section, and a rear section;
- said frame having one main vertical strut member extending vertically from the rear end of said middle frame section, two upper rear frame connectors extending downward and rearward at approximately 30–35 degrees, and two lower rear frame connectors extending upward and rearward from the intersection of the rear end of the middle frame and the bottom of the vertical strut to form the two triangular rear frame sections one on each side;
- said frame including a slot for receiving a bicycle wheel axle;
- a telescoping steering member hingedly connected to the forward portion of said frame having a front wheel disposed in said steering member, said front wheel including a wheel axle and braking means;
- a handlebar and a handlebar support bar adjustably connected to said steering member and a hinged tubular frame member;
- a rear wheel connected to the rear frame section, said rear wheel including a rear wheel sprocket, wheel axle, braking means, and coasting means;
- a propulsion sprocket connected to two corresponding crank arms located at the top of said vertical strut frame member having connected thereto a rear wheel sprocket and axle;
- a chain connected between said propulsion sprocket and said rear wheel sprocket;
- a bike stand assembly including a spring mounted leg assembly means connected to said frame of said bicycle, a stopper latch fixed within said housing, a spring means including a hand operated cable connected between said spring means and a hinged handle connected to said handlebar of said bike, which when activated sets the leg assembly into a lowered position in supportive anterior angulated juxtaposition with the ground surface such that said bicycle is maintained in a substantially upright orientation to said ground surface;
- said middle frame section including a right revolvable connector pin affixed on the right side and a left revolvable connector pin affixed on the left frame side;
- a housing covering said propulsion sprocket, said rear wheel sprocket, said chain, said braking means and said bike stand assembly to prevent the operator from interacting therewith;
- an elongated right step arm including a support body internally and externally encased at its front end having an elongated slot that connects to the right connector pin and allows for coupled linear movement at the front end and having a rotatable fastener connected at the rear of the step arm allowing for linear movement provided by the circular propulsion sprocket, said right step-arm connected at approximately 180 degrees from said left step-arm connected by first and second crank arms to said propulsion sprocket; and
- an elongated left step arm including a support body internally and externally encased at its front end having an elongated slot that connects to the left connector pin and allows for coupled linear movement at the front end and having a rotatable fastener connected at the rear of the step-arm allowing for linear movement provided by the circular propulsion sprocket, said left step-arm connected at approximately 180 degrees from said right step-arm connected by first and second crank arms to said propulsion sprocket.

11. The bicycle as in claim 10, further including a housing covering said propulsion sprocket, said rear wheel sprocket, said chain, said braking means, and said bike stand to prevent the operator from interacting with said sprockets, said chain, said braking means, and said bike stand.

12. A bicycle as in claim 11, further including a cable-operated braking means comprising a pair of brake pads disposed against the front wheel and a pair of brake pads disposed against the rear wheel, said rear wheel brake pads emanating from said lower rear frame connector bar.

13. The bicycle as in claim 10, wherein said rear wheel is about 24 inches in diameter and said front wheel is about 12 inches in diameter.

14. The bicycle as in claim 10, wherein said rear wheel is larger in diameter than the diameter of said front wheel.

15. The bicycle as in claim 10, wherein said middle section of said unibody frame is between about 6 and 8 inches above the ground during operation of said bicycle.

16. A bicycle for recreation, exercise, and transport comprising:
- a unibody frame, having a forward section including a front wheel and a steering column, a middle section, including connector pin affixed on the right side and a connector pin disposed on the left side, and a rear section including one main vertical strut, two upper rear connectors, and two lower rear connectors;
- said frame including one main vertical strut member extending from the end of said middle frame section, two upper rear frame connectors extending downward and rearward at approximately 30–35 degree angles, and two lower rear frame connectors extending upward and rearward; the intersection of the rear end of the middle frame and the bottom of the vertical strut to form the two triangular rear frame sections, one on each side;
- said frame including a slot for receiving a bicycle wheel axle;
- a steering means moveably connected to the forward section of said frame having a front wheel disposed therein and a handlebar and handlebar support bar adjustably connected to said steering means;
- a rear wheel connected to the rear frame section, said rear wheel including a rear wheel sprocket, rear wheel axle, braking means, and coasting means;
- a propulsion sprocket connected to two corresponding crank arms located at the top of said vertical strut frame member and encased within said cylindrical frame housing;

an angularly disposed chain connected between said propulsion sprocket and said rear wheel sprocket;

an elongated step-arm including a support body encased at its front end having an elliptical, elongated slot that connects to the right connector pin and allowing for coupled linear movement at the front end and having a rotatable fastener connected at the rear of the step-arm allowing for rotating movement provided by the circular propulsion sprocket;

an elongated left step-arm including a support body at its front end having an elliptical, elongated slot that connects to the left connector pin and allowing for coupled linear motion at the front end and having a rotatable fastener connected at the rear of the step-arm allowing for rotating movement provided by the circular propulsion sprocket;

said right step-arm connected at approximately 180 degrees from the left step-arm sprocket connection whereby said right step-arm and said left step-arm have coupled forward and backward linear movement at the front of each step-arm and the right step-arm and left step-arm have circular movement at the rear of each step-arm relative to said propulsion sprocket thereby providing a teardrop motion when pedaling said bicycle; said teardrop motion being a combination of linear motion at the front of said step-arm and circular motion at the rear of said step-arm;

a housing covering said propulsion sprocket, said rear wheel sprocket, chain, and braking means to prevent entanglement with the operator or operator's clothing; and a bike stand apparatus comprising:

a leg assembly connected to said frame of said bicycle by a spring mounting means fixed to a stopper latch connected to said housing such that said leg assembly means is capable of being placed in a lowered position or in a retracted position by actuation of a hand operated cable connected between said spring mounting means and a hinged handle connected to said handlebar support of said bicycle;

wherein said leg assembly is capable of maintaining said bicycle in an upright orientation when said leg assembly is in a lowered anteriorly angulated position;

wherein said leg assembly is released into said lowered position anteriorly angulated in supportive juxtaposition with the ground surface such that said bicycle is maintained in a substantially upright orientation to said ground surface.

17. The bicycle as in claim 16, wherein said steering means comprises a tubular frame portion which is hingedly connected at its lower end to said forward frame section and said handlebar support bar telescopes within said tubular frame portion to provide height, angle, and distance adjustability of said steering means for more comfortable and safe operation of said bicycle by a variety of sized operators.

18. The bicycle as in claim 10, wherein said angle of connection between said upper rear frame connector and said rear wheel axle is between approximately 30 and 35 degrees.

19. The bicycle as in claim 10, further including a cable-operated braking means comprising a pair of brake pads disposed against the front wheel and a pair of brake pads disposed against the rear wheel, said rear wheel brake pads emanating from said lower rear frame connector bar.

20. The bicycle as in claim 19, wherein said rear wheel is larger in diameter than the diameter of said front wheel.

* * * * *